United States Patent [19]

Balderson

[11] 4,074,244
[45] Feb. 14, 1978

[54] AUDIBLE-VISUAL WARNING ALARM SYSTEM

[76] Inventor: Robert Bruce Balderson, 53 Pueblo Road, New Britain, Pa. 18901

[21] Appl. No.: 597,207

[22] Filed: July 18, 1975

[51] Int. Cl.² .............................................. G08B 23/00
[52] U.S. Cl. ........................... 340/244 R; 340/244 A; 340/244 B; 340/326; 340/384 E
[58] Field of Search ........... 340/244 R, 244 A, 244 B, 340/384 E, 326, 220; 73/307, 313; 179/186

[56] References Cited

U.S. PATENT DOCUMENTS

| | | | |
|---|---|---|---|
| 1,636,698 | 7/1927 | Leonard et al. | 340/220 |
| 3,213,438 | 10/1965 | Feuce et al. | 340/244 R |
| 3,868,684 | 2/1975 | Nunn | 340/384 E X |
| 3,898,514 | 8/1975 | Takahashi | 340/384 E X |
| 3,906,491 | 9/1975 | Gosswiller et al. | 340/384 E X |
| 3,930,123 | 12/1975 | Carroll | 340/384 E X |

*Primary Examiner*—John W. Caldwell, Sr.
*Assistant Examiner*—Daniel Myer
*Attorney, Agent, or Firm*—Z. T. Wobensmith; Z. T. Wobensmith, III

[57] ABSTRACT

An audible-visual warning alarm system ready for easy installation and suitable for use out of doors is disclosed in which two different sets of audible and visual signals are provided suitable for but not restricted to use with multiple liquid level sensing devices, one set preferably having priority over the other, the sound levels preferably being adjustable but different, the speaker through which the audible signals are made available also having an optional voice input.

8 Claims, 2 Drawing Figures

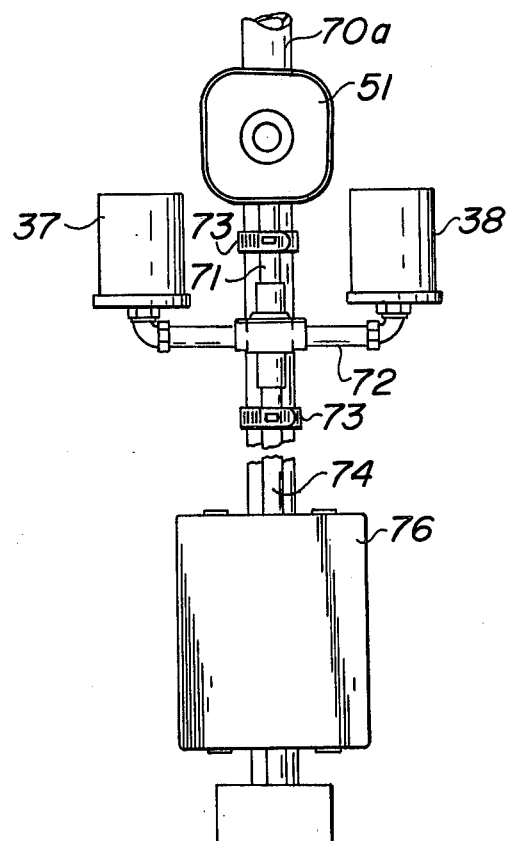
FIG. 1
FIG. 2
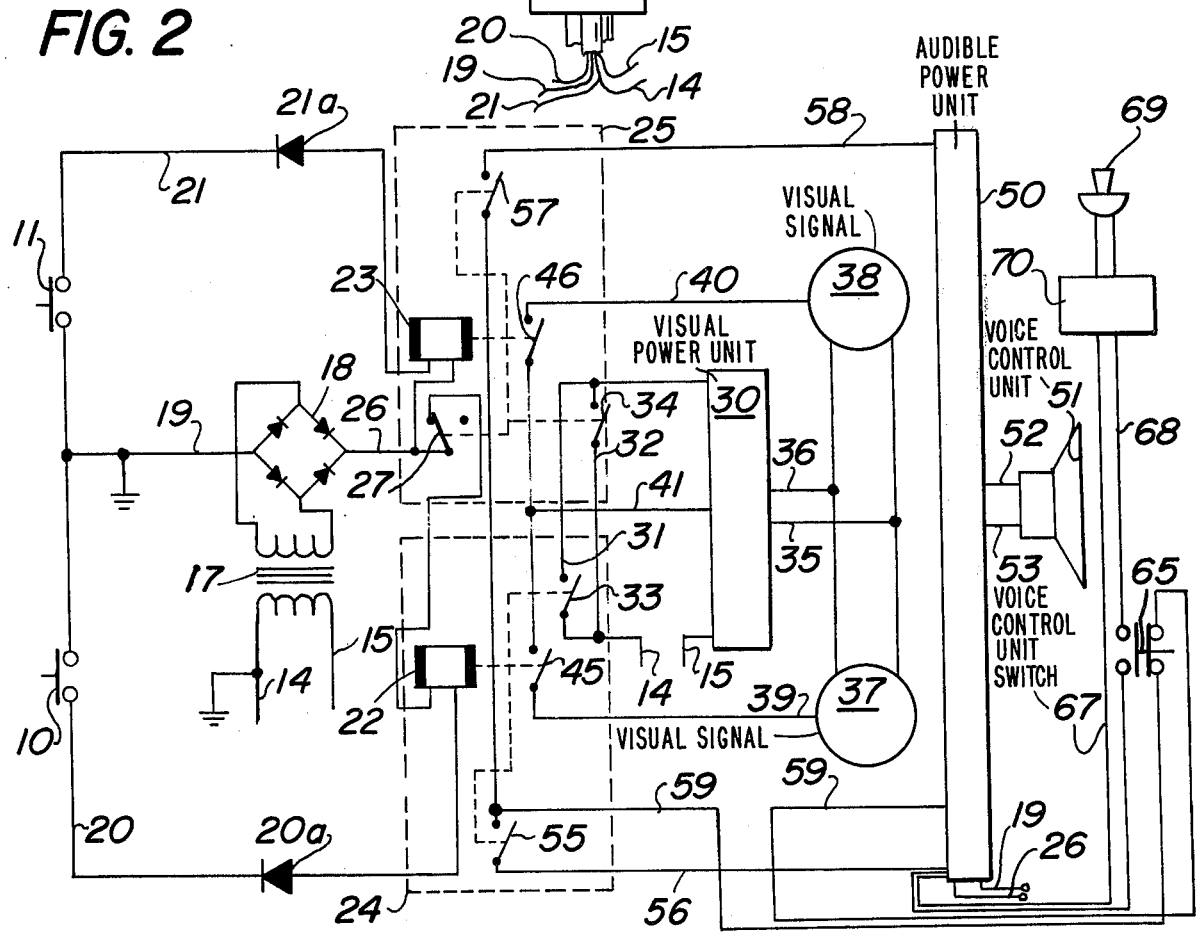

AUDIBLE-VISUAL WARNING ALARM SYSTEM

BACKGROUND OF THE INVENTION

1. Field of the Invention

This invention relates to audible-visual warning alarm systems.

2. Description of the Prior Art

Various visual and audible signal systems have heretofore been proposed but these have had shortcomings from the viewpoint of complexity of design, difficulty of installation, or have had maintenance problems.

McGill, in U.S. Pat. No. 3,545,272, shows a liquid level warning device responsive to a pluarlity of liquid levels to provide corresponding visual indications through vari-colored lamps. The structure shown might be useful on an instrument panel but is not suited for use out of doors or with concurrent audible signals.

Alexander, in U.S. Pat. No. 3,685,357, shows a sensor responsive to a plurality of liquid levels with signal lights of the panel type giving visual indications of the respective levels, except for an auxiliary audio signal for high liquid level. No provision is made for out of doors operation, nor for a plurality of different audible signals at different levels with one input having priority over the other.

Cromer, in U.S. Pat. No. 3,346,857, shows plural tone audible indicating apparatus responsive to different liquid levels with repetitive changes from one tone signal to the other controlled by a free running multivibrator. The signals are intended to be connected to a telephone line for interpretation through normal hearing by means of a conventional telephone instrument at a remote point.

SUMMARY OF THE INVENTION

In accordance with the invention an audible-visual warning alarm system is provided suitable for use out of doors with loud sounding audible tones at two separate adjustable distinctive levels and the audible output direction being adjustable, having high intensity lights and with distinctive colors, the signals for one level having priority over the signals for the other.

It is a principal object of the invention to provide an audible-visual alarm system which is simple to install, reliable in its operation, which is of a nature to command attention in accordance with the ouput signals, and which is particularly suitable for out of doors installation of the signals.

It is a further object of the invention to provide a system of the character aforesaid which utilizes available visual signal components.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a view in elevation of an audible-visual alarm system in accordance with the invention; and FIG. 2 is a schematic of the alarm system.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to FIG. 2 alarm actuation devices are shown at 10 and 11 responsive to liquid level sensors of any preferred type providing signals for two different levels as to which audible and visual alarms are desired. The actuation devices 10 and 11 may be relays, pushbuttons or switches, mechanically, pneumatically or electrically operating to respectively control portions of alarm actuating circuits.

Power input leads 14 and 15 are provided, preferably connected to a 120 volt ac source, with lead 14 connected to ground. The leads 14 and 15 activate a transformer 17 which in turn is connected to a rectifier 18 to provide a dc output, preferably of 24 volts.

The rectifier 18 as a dc source is connected on one side by a conductor 19 to conductors 20 and 21 and which may have protective diodes 20a and 21a therein, in which the actuation devices 10 and 11 are included, and extend therefrom to coils 22 and 23 of relays 24 and 25 to the opposite ends of which the dc source 18 is connected by conductor 26. A normally closed contact 27 controlled by relay 25 is effective to deenergize the relay 24 when relay 25 is energized.

A visual power unit energizing unit 30 is provided having power supply connectors 14 and 15 connected thereto with alternative connectors 31 and 32, the connector 31 having a normally open contact 33 of relay 24 therein and the connection 32 having a normally open contact 34 of relay 25 therein and conductors 35 and 36 extending respectively to high intensity visual signals 37 and 38.

The visual power energizing unit 30 also has a common conductor 41 connected to the junction of conductors 39 and 40 and extending thereto.

The visual signals 37 and 38 also have conductors 39 and 40 extending thereto from the common conductor 41, the conductor 39 having a normally open contact 45 of the relay 24 and the conductor 40 having a normally open contact 46 of the relay 25 therein.

The visual signals 37 and 38 are preferably of high intensity 360° strobe beams of amber and red respectively of 80 fpm minimum although other suitable high intensity light sources such as rotary beacons could be employed and of other colors, such as blue, white, and/or green.

An audible power unit 50 is provided having power supply connections 19 and 26, connected to a speaker 51 by conductors 52 and 53.

The audible power unit 50 is controlled by a normally open contact 55 of relay 24 in conductor 56 and normally open contact 57 of relay 25 in conductor 58, the junction of the conductors 56 and 57 being connected by a common conductor 59, connected to the audible power unit 50.

The audible power unit 50 preferably has modules therein to provide two audible signals of the order of 110 decibels at ten feet for delivery to the speaker 51, audible on an alternating high and low (high-low) and the other descending high to low repeated (yeow) for simultaneous delivery respectively of audible signals corresponding to the visual signals 37 and 38, although if desired by use of appropriate modules the two audible signals can be the same.

For some installations it is desirable to utilize the speaker 51 for voice transmission and for this purpose a switch 65 can be interposed in the conductor 59 for interrupting that conductor and connecting to the speaker 51 by connectors 67 and 68 a microphone 69, through a voice control unit 70.

In a specific embodiment and particularly for use out of doors the speaker 51, as shown in FIG. 1 can be mounted on a pole 70a or the like with the conductors 52 and 53 enclosed within protective tubing 71 which can be secured to the pole 70a, by clamps 73, with the visual signals 37 and 38 carried on a horizontal tube 72 on which the tubing 71 is mounted. The tube 72 can be connected by a tube 74 to a housing 76 in which the audible power unit 50, the visual power unit 30, the relays 24 and 25 and their contacts, and the transformer 17 rectifier 18 and their connections are enclosed and protected.

The mode of operation will be apparent form the foregoing.

One condition, such as a particular liquid level, effective at the alarm actuation device 10 is effective for energizing the coil 22 of relay 24 which in turn is effective for energizing, through contacts 33 and 45, the visual signal 37, and through the contact 55 the corresponding audible signal made available through the speaker 51.

If the actuation device 11 is actuated by a different condition such as a different liquid level, this is effective for energizing coil 23 of relay 25 which in turn is effective for energizing through contacts 34 and 46, the visual signal 38, and through the contact 57 the corresponding audible signal made available through the speaker 51.

It will be noted that relay 25, through contact 27 cuts off the energization of the relay coil 22 and thus cuts off the visual and audible signals initiated by the alarm actuation device 10.

I claim:

1. A warning alarm system comprising
   a pair of different visual signals, audible signal means having a pair of different delivered signals corresponding respectively to each of the visual signals and having speaker means for delivery of said audible signals,
   signal input means responsive to a plurality of conditions,
   control means for said visual signals and said audible signal means responsive to one condition for maintaining said visual and audible signals in an inactive condition and to different predetermined conditions of warning for selectively simultaneously initiating one of said visual signals and delivery of a corresponding audible signal through said speaker means for one condition of warning and for selectively simultaneously initiating a different one of said visual signals and delivery of a corresponding different audible signal through said speaker means,
   said control means including members for providing a priority of one of said audible signals over the other,
   auxiliary voice input means including a microphone selectively connected to said speaker means,
   said voice input means including members for cutting off audible alarm signals to said speaker means and connecting said microphone to said speaker means thereby overriding said audible signal means without overriding said visual signals.

2. A warning alarm system as defined in claim 1 in which said visual signals are circumferentially visible.

3. A warning alarm system as defined in claim 1 in which said visual signals are strobe lights.

4. A warning alarm system as defined in claim 1 in which said visual signals are rotary beacons.

5. A warning alarm system as defined in claim 1 in which said signal input means is responsive to different liquid levels.

6. A warning alarm system as defined in claim 1 in which said control means includes relays each controlled by an input signal and having contacts for selective delivery of a visual signal and a corresponding audible signal.

7. A warning alarm system as defined in claim 1 in which said control means includes a member for preventing simultaneous audible signals.

8. A warning alarm system as defined in claim 1 in which
   members are provided for mounting said speaker means, and said visual signals in contiguous relation for display of said visual signals.

* * * * *